May 9, 1967  F. B. SCOTT  3,318,435
CONVEYOR CARRIER
Filed March 3, 1966  5 Sheets-Sheet 1
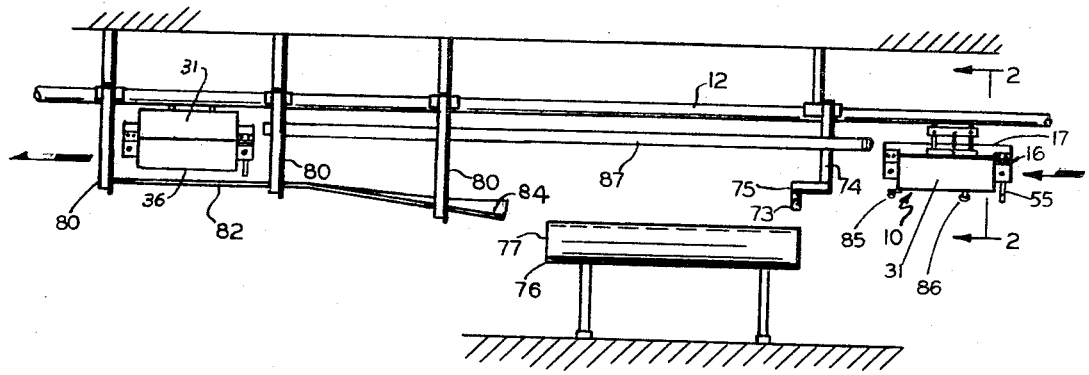
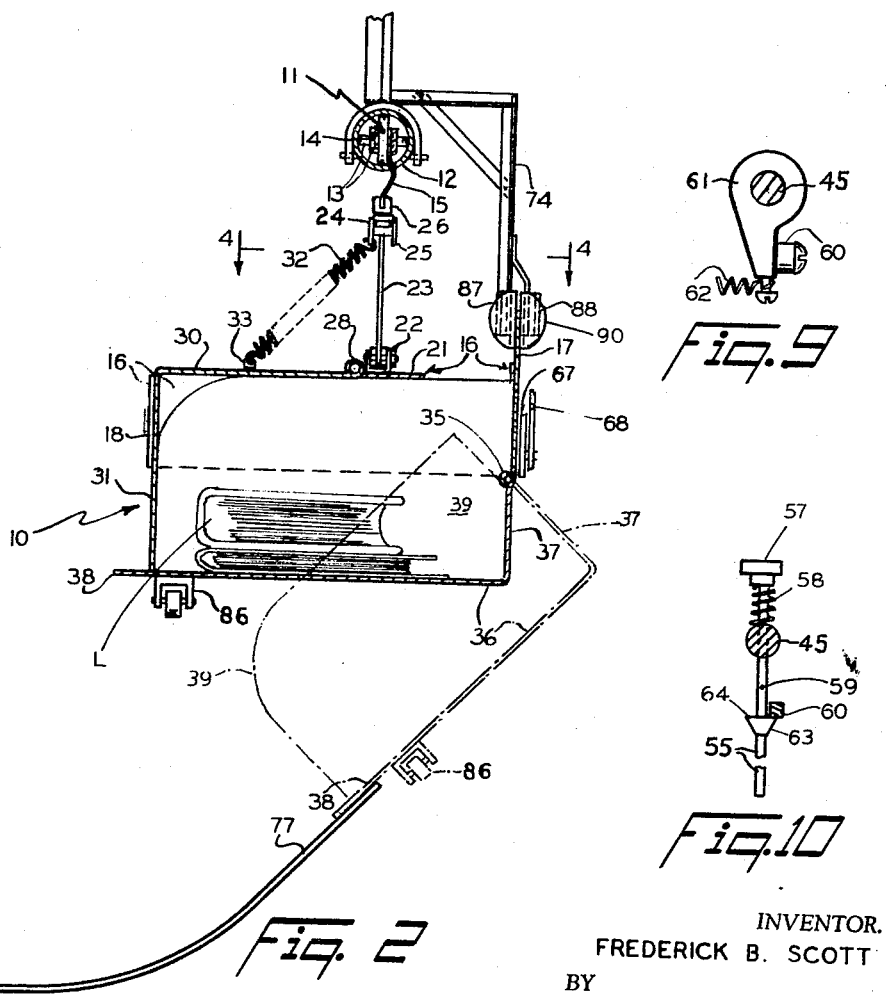
INVENTOR.
FREDERICK B. SCOTT
BY
*J. P. Kenyon*
ATTORNEY

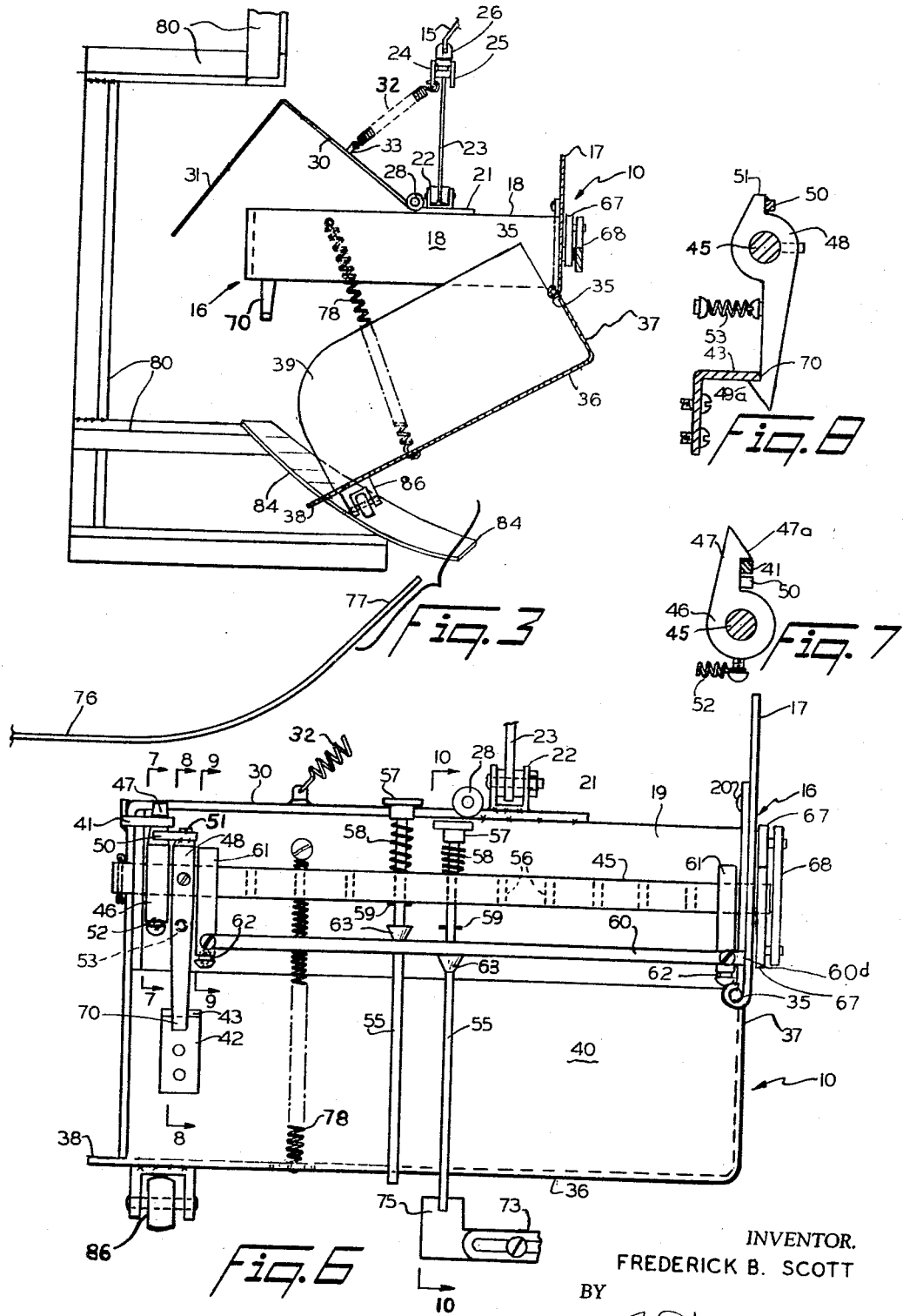

May 9, 1967  F. B. SCOTT  3,318,435
CONVEYOR CARRIER
Filed March 3, 1966  5 Sheets-Sheet 3

INVENTOR.
FREDERICK B. SCOTT
BY
ATTORNEY

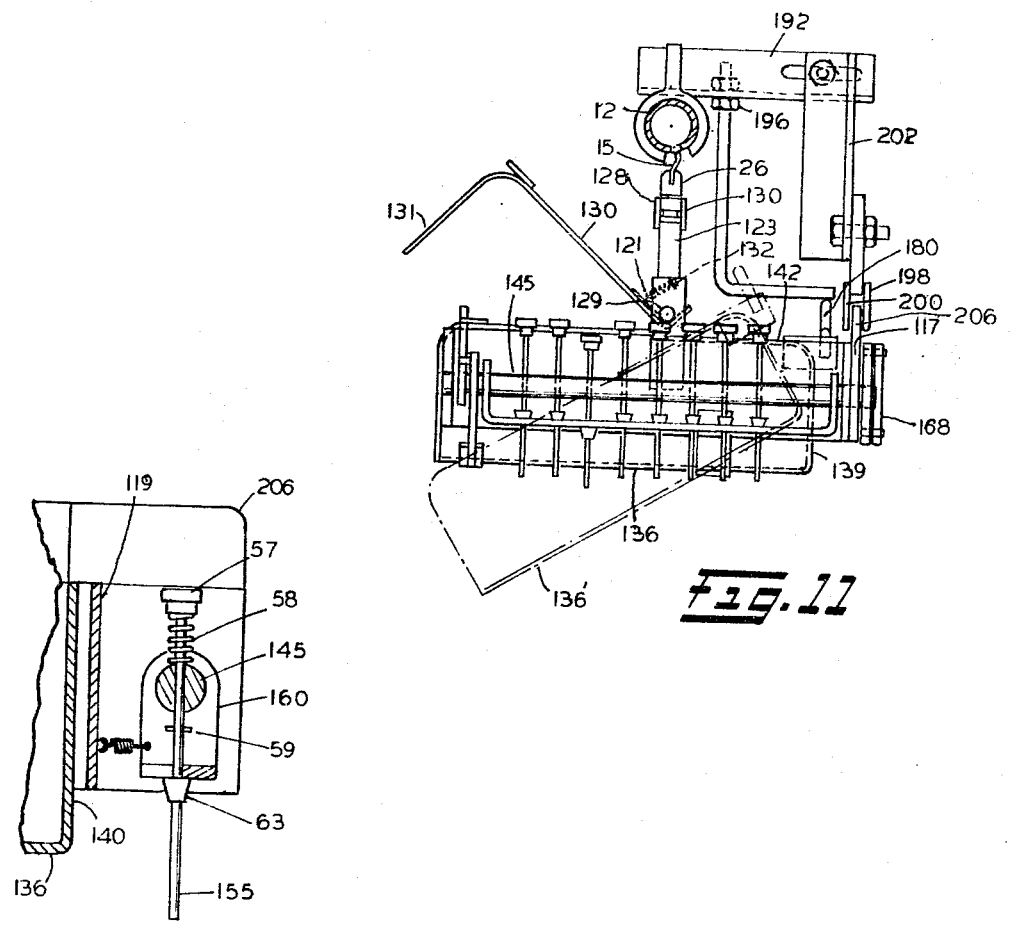

United States Patent Office 3,318,435
Patented May 9, 1967

3,318,435
CONVEYOR CARRIER
Frederick B. Scott, Syracuse, N.Y., assignor to Syracuse Supply Company, Syracuse, N.Y., a corporation of New York
Filed Mar. 3, 1966, Ser. No. 531,392
7 Claims. (Cl. 198—38)

This invention relates generally to conveyor systems and has particular reference to a carrier for transporting articles through any selected portion of a circuit and discharge at any preselected one of a plurality of stations.

The system contemplates a conveyor carrier operable through a predetermined path, not necessarily at a single level, the system having a plurality of unloading stations equipped with trip mechanism cooperating with latch release mechanism on the carrier for automatically effecting unloading of the carrier at a pre-selected station as pre-selected by manual actuation of carrier mechanism at the time of loading. Each carrier, when loaded, preferably becomes a locked box, which remains closed until discharge at a pre-selected station.

An object of the invention is to provide an article carrier for a conveyor system, the carrier having presettable mechanism for automatic discharge at a selected one of a plurality of stations located along the carrier circuit.

Another object is to provide a conveyor system of the character described which is adapted to serve a plurality of unloading stations, the carriers of which may be loaded and closed at any point along the conveyor circuit, and caused to discharge at any pre-selected station along the circuit, after which the carrier again becomes available for a further load.

A further object is to provide a conveyor system of the character described having a box-like article carriers having containers with closure members biased to open for loading and adapted to be closed on loading and remain closed until discharge of the container contents is effected at a station pre-selected at the time of loading. Thus provision for safe transport of confidential files and the like to a predetermined station is assured.

The above objects and other features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 1 is a side elevational view of a portion of a conveyor system according to the invention, showing a closed carrier approaching one of the stations and an open carrier leaving the station;

FIGURE 2 is an enlarged sectional view on the line 2—2 of FIGURE 1, the carrier container discharge position being shown in broken lines;

FIGURE 3 is a view similar to FIGURE 2 showing the carrier leaving the station subsequent to discharge;

FIGURE 6 is an enlarged trailing end view of the carrier;

Figure 12:
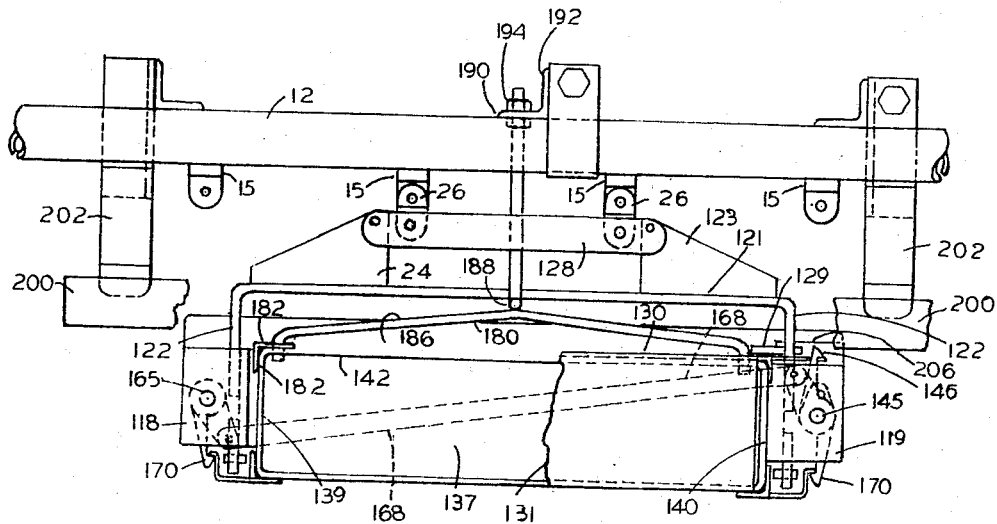
Figure 13:
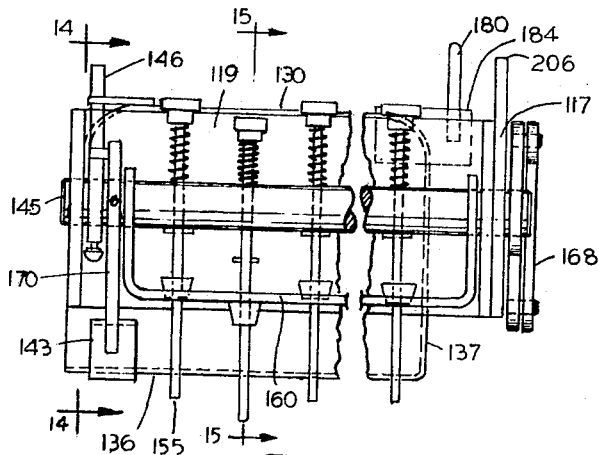

FIGURES 7, 8, 9 and 10 are sectional views taken substantially on lines 7—7, 8—8, 9—9, and 10—10, respectively, of FIGURE 6;

FIGURE 11 is an end elevation of a modified carrier;

FIGURE 12 is a side elevation of the modified carrier with parts broken away;

FIGURE 13 is an enlarged fragmentary end elevation, and

Figure 14:
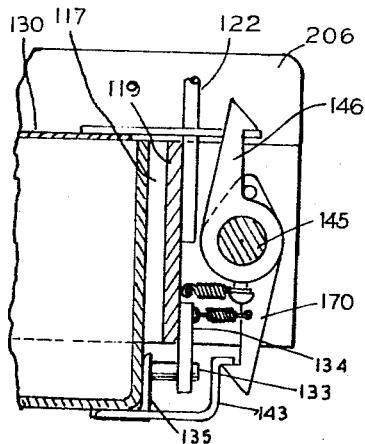

FIGURES 14 and 15 are sectional views taken substantially on the lines 14—14 and 15—15, respectively of FIGURE 13.

Referring to the drawings, the carrier 10 is shown suspended from adjacent spaced trolley pendents 15, depending from an endless roller chain 14 running continuously in the tubular track 12, the track having a continuous slot in its underside. Such track and conveyor may be of the type shown in U.S. Patent No. 2,768,733. In FIGURE 1, two carriers are shown, one on the right approaching a discharge station, and one on the left, leaving a station with its cover open for loading.

Figure 4:
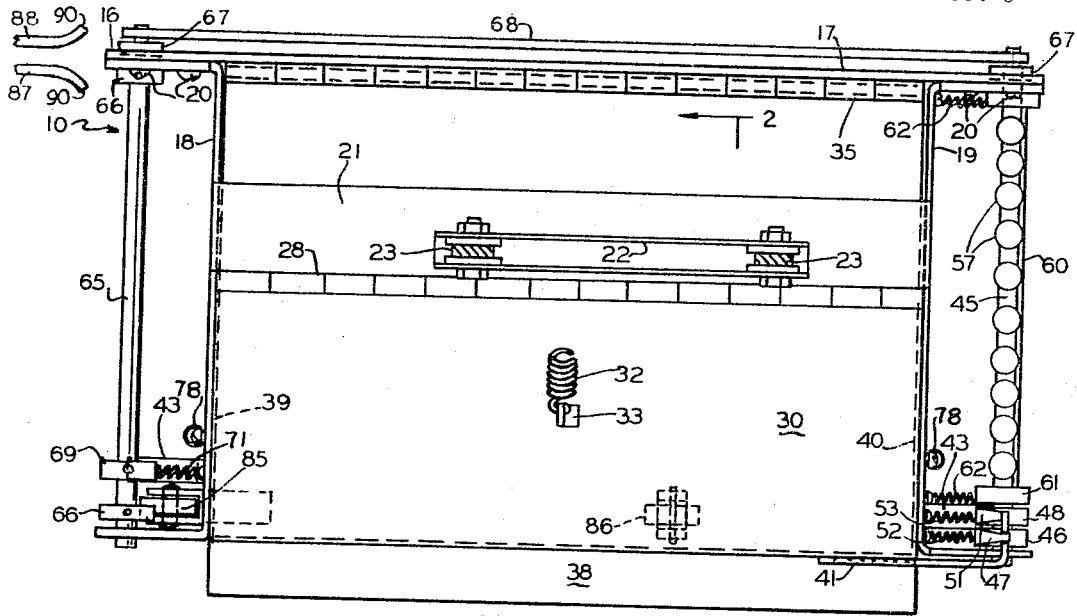
FIGURE 4 is a further enlarged top plan view of the carrier of FIGURE 2, partly in section on the line 4—4 of FIGURE 2.
Figure 5:
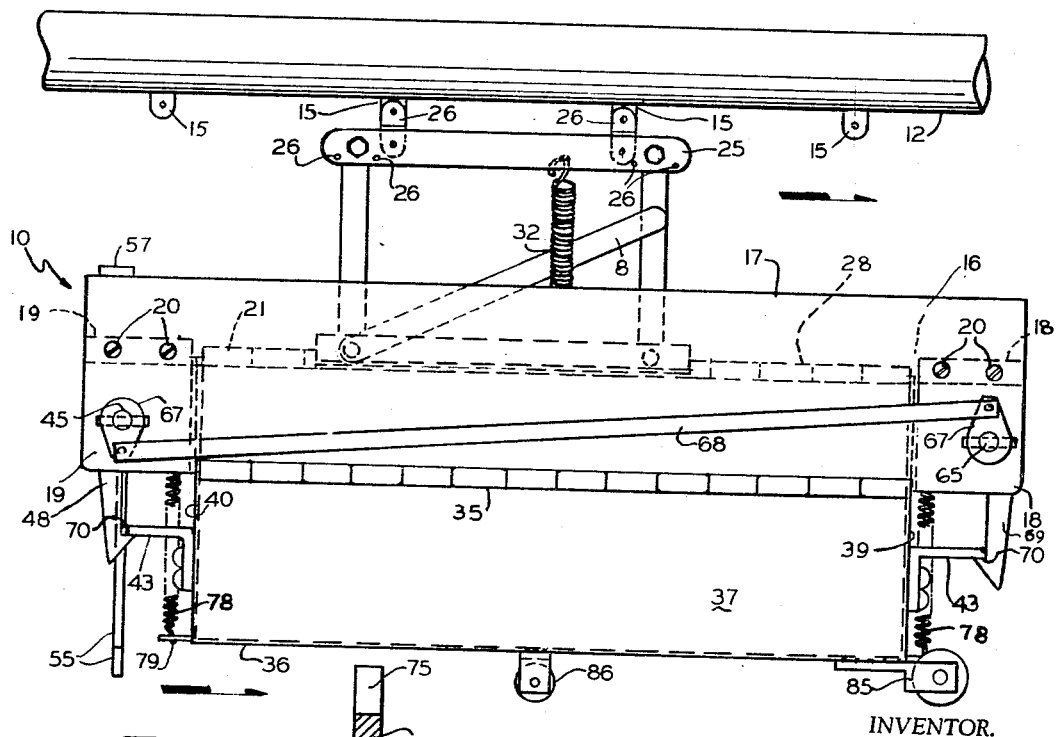
FIGURE 5 is an enlarged rear elevation of the carrier and track of FIGURE 1.

As shown in FIGURES 3–5, the carrier 10 comprises a frame 16 having a lengthwise extending back member 17, and fore and aft U-shaped transverse end members 18 and 19, secured to the member 17, as by screws 20, and a plate 21 connecting the end members.

A channel member 22 is secured to the top surface of the plate 21 from which links 23 extend upwardly to spaced connecting members 24 and 25. Conveyor pendents 15 are connected to the upper bifurcated ends of swivels 26, the lower ends of which are pivoted between the members 24 and 25, on pins 27. A diagonal brace 28 may be employed to maintain the links 23 substantially perpendicular to the plate 21, or eliminated so as to permit the carrier to be freely suspended, so that when conveyed along a section of vertical track, the links 23 will allow the carrier to approach the conveyor tube, to lessen the size of floor or other openings through which the vertical section of track may extend.

Pivotally hung from the lower edge of the member 17, as by a piano hinge 35, is container 36 having fore and aft end walls 39 and 40, and a back side wall 37, the upper edge of which may be formed as a portion of the hinge 35. The front side of the container is open, and the container is normally supported by the hook ends 70 of latch arms 48 and 69 affixed to rock shafts 45 and 65, the latter extending through and being journalled in the opposite end portions of the U-frame members 18 and 19. Shaft 65 is provided with collars 66. The hook ends 70 of the arms 48 and 69 engage brackets 43 affixed to the fore and aft end walls of the container, and support the container in carrying position.

The container is provided with a cover or lid 30, hinged as at 28 to a side edge of the plate 21 of the frame 16. The cover comprises a skirt 31, to normally coact with the open side of the container and provide, a box-like closure when closed, therefor. The lid is urged to open position as indicated in FIGURE 3 by a tension spring 32 secured to the lid as at 33, and to one or both of the members 24 and 25.

The rock shafts 45 and 65 at their rear ends are provided with like but oppositely extending cranks and a diagonal connecting link 68, whereby to enforce simultaneous opposite rotation of the shafts 45 and 65, so that hook ends 70 of arms 48 and 69 may be simultaneously swung out of engagement with the brackets 43 to permit the open side of the container to swing down about hinge 35 for discharge of the contents. A portion of the weight of the container is counter balanced by springs 78 at opposite ends, affixed to the frame members 18 and 19, and projections such as 79 from the container. The springs serve to cushion the movement of the container when released, especially should it contain a relatively heavy load such as a book or files as indicated at L in FIGURE 2. At each station where discharge may be effected, a chute 77 may be provided to receive the discharge and convey the same to a convenient platform 76.

The lid is held closed by an upwardly extending latch arm 46 pivoted freely on the rock shaft 45, the hook end 47 engaging the end of an L-shaped arm 41 affixed to the upper portion of the cover skirt. The cover hook 47 faces oppositely from the latch hook 70 of arm 48. The rock shaft 45 and the arm 48 and its hook 70 are urged toward latching position by a tension spring 53. The latch arm 46 with its hook end 47 is urged toward latching position by a tension spring 52. The latch arm 46 bears against a lateral projection 50 affixed to the upper end of latch arm 48, so that when the rock shaft 45 rotates arm 48 to unlatch the container, the lid latch is also rotated to simultaneously release the cover to move to its open position. The projection 50 permits the latch arm 46 to swing inwardly for self latching, whenever the lid is manually closed, without disturbing or unlatching the container when the container is in normal latched position. Each of the latch arms 46 and 48 have inclined camming surfaces 47a and 49a respectively to provide for self latching whenever the container or lid are moved to closed position, and the respective springs 52 and 53 of the latch members 46 and 48 are such as to limit the rotation thereof when unlatched so that the camming surfaces 47a and 49a will be in alignment with the lid arm 41 and the tray brackets 43 for the self latching action referred to.

It will be understood that one or a plurality of carriers may be attached to the conveyor at suitable intervals so as to be repetitively conveyed around the conveyor circuit. If a carrier is empty, it will proceed with the lid in open position so that at any point along the length of the circuit, the carrier can be loaded, and the lid thereupon closed and latched. Any documents, files or other material are thus conveyed in a sealed up manner. In order to pre-select a particular station along the way at which discharge is to be effected, a plurality of pre-select pins 55 are slidably disposed in transverse apertures in the rock shaft 45. Each pre-select pin has a button 57 which may be numbered or lettered and is resiliently urged upward by a coil spring 58, the upward movement of each pin being limited by stop member 59. Each pin is also provided with a conical cam 63 with a shoulder 64 that is adapted to be cammed past a resiliently yielding lock bar 60, upon manual depression, to thereby hold the pin in depressed position. The lock bar is rigidly connected to arms 61 which are in turn freely pivoted on the rock shaft 45. The arms 61 are provided with springs 62 to urge the lock bar toward the pre-select pins 55 and the bar may be extended as at 60a to engage the frame member 19, to provide a stop. The pins 55 are of such a length, as to extend below the container 36, when locked in depressed position by the lock bar 60.

At each station where it is desired to effect discharge of the carrier, a stationary detent is provided as at 75, which is adapted to lie in the path of the lower end of one of the pins 55 when depressed. The detent is laterally positioned to lie in the path of one pin so that by depressing such pin to locked position, the carrier will be caused to discharge at such station. Other stations will have the detents aligned for other pins, and the pin button indicia will indicate which pin will be actuated by the various station detents along the way. The detent 75 may be supported adjustably on an arm 73 so that the detent can be set to lie in the path of any one of the pins as desired.

It will be seen (see FIGURES 5 and 6) that a depressed pin 55, upon engaging a stationary station detent 75, will, due to the conveyor movement of the carrier, cause the pin to rock shaft 45 clockwise as shown in FIGURE 5, to clear the detent, thereby releasing both latches 48 and 69, and latch 46, to discharge the contents of the container upon the chute 77 at the particular station and open the lid.

As the continuously moving empty carrier leaves the station, a roller 85 disposed beneath the container adjacent the leading end, engages a stationary helical cam track 84 supported from columns 80, to cam or lift the container to the self latching position. The lid remains open, as the carrier proceeds along the course, awaiting loading at any point, followed by manual closure of the lid. When reloaded, any one of the selector pins may be depressed depending on the delivery station desired. Depressing any pin rocks the lock bar to release any pin formerly locked by the bar, thus clearing the trip mechanism of the carrier for a new selection and so that an interlock permitting but one pin to be held depressed is provided.

To steady the carrier as it approaches a trip detent at a station, and to assure that the trip detent 75 will be aligned with the end of the pre-selected pin 55, a pair of spaced guide rails 87 and 88 supported in any suitable manner, as from the bracket 74, may be so disposed as to accept the upstanding portion of the frame member 17 of the carrier, as the carrier approaches and moves into the trip position. It will be understood that the carrier, being suspended, may be out of alignment, by reason of off center loading. The rails have entering flared ends 90 to accept and guide the frame member 17 into line. The length of the rails need only to be long enough to provide a guide effect while the carrier trip pin passes the station detent. Such rails may be extended if desired, to steady the carrier during discharge or during the camming up of the container from the discharge position to the latched position.

If desired an additional roller 86 may be applied to the underside of the container centrally thereof to engage the level end portion 82 of the trackway 84 to assure lifting the container 36 at both ends to actuate both latch members 48 and 69 into engagement with their respective brackets 43.

Referring to FIGURES 11–15 there is shown a carrier having a similar frame open on one side and composed of a back member 117, fore and aft transverse U members 118 and 119, and a heavy connecting hanger member 121, the depending ends 122 of which are affixed to the transverse members 118 and 119. The hanger is provided with blocks 123 and 124 connected by spaced links 128 and 130, between which are pivoted swivels 26, which in turn are connected to the conveyor chain pendents 15 protruding through the slot in the tubular track 12.

An open side container 136 having fore and aft end walls, 139 and 140, and a back wall 137, and a partial top wall 142 is provided with pivot brackets 135 having pivot pins 133 extending into apertures in depending pivot plates 134 affixed to the members 118 and 119. The container may be of molded plastic or other material, and the location of the pivot pins 133 is such as to assure imbalance of the container to the discharge position 136', whenever the rock shaft latches 170 disengage from the laterally extending latch plates 143 affixed to the underside of the container.

A lid or cover 130 of light plastic or other material, having a skirt 131 is provided with hinge pins 129 extending into apertures in the depending ends 122 of the hanger member 121. A tension spring 132 between the bracket end 122 and the lid, urges the lid to open position. As in the previous modification, the lid and container are held in closed position by a latch 146, and latches 170 respectively, the latter being affixed to the rock shafts 145 and 165, which are linked for opposite rotation as at 168, the latch 146 being freely pivoted on the shaft 145 and actuated to release by release rotation of the latch 170 on shaft 145. As before, the rock shaft 145 is provided with station selector pins 155, with an interlock rail 160, all operating similarly to that previously described.

In order to restore the container 136 to carry position after discharge at a station, the upper back side of the container is fitted with a cam rod 180 supported on members 182 and 184 affixed to the container 136. The cam rod has a portion 186 inclined with respect to the line of travel, and is adapted to ride against the underside of an L-shaped actuating arm 188, the upper end of which is adjustably fixed to the flange 190 of a conveyor track support arm 192, by means of nuts 194 and 196 disposed on opposite sides of the flange 190. The cam rod tilts the container to the level position where it engages latches 170 and is held.

The carrier is also steadied and guided into line when approaching a station, as previously described, through provision of spaced rails 198 and 200 between which the upwardly extending portion 206 of the back frame member 117 is guided. As before such rails need only be of a length to assure alignment of a pre-selected pin 155 when approaching a station detent and have a flared entrance. The rails are supported from brackets such as 202 depending from a track support arm 192.

The arm 188 is located beyond a station so that as the carrier with its container in discharged position continues, the container is returned to latched position, by the camming action of the cam inclined portion 186 of rod 180, riding under the arm 188.

The open sided carrier frame and trip mechanism, common to both modifications can be readily adapted to accommodate various sizes and shapes of containers, trays and lids, and can readily be adapted for use in any type of chain or cable conveyor system. The entire operation of the carrier in effecting and assuring transport to a pre-selected station, derives its actuating power essentially from the conveyor movement.

It will be understood that the carriers are continuously conveyed at a uniform rate, slow enough to permit loading and setting of the station selector, while on the move. If higher speeds are desirable, a plurality of stop switches located at intervals along the system can be employed to momentarily stop the conveyor for loading and station selecting.

While a single form of the invention with a variation has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a conveyor system including a load carrying trolley and its supporting track, an article carrier having an open frame adapted to be suspended from the conveyor system, a container having one side open, pivotally mounted on the carrier frame for discharge from the open side, latch means carried by the frame and releasably supporting said container against discharge in non-discharge position, latch release means on said frame and including a trip adapted to engage a stationary detent for actuation by movement of the carrier along the track, and at least one discharge station disposed along the track having a detent adapted to engage the carrier trip for container discharge, and means responsive to conveyor movement of said carrier for restoring the container to its latched non-discharge position.

2. An article carrier in accordance with claim 1 having a cover for the container and its open side, said cover being pivoted on the frame and biased to open position, means for latching the cover in closed position, and means for releasing said cover latching means upon actuation of said container latch release means.

3. An article carrier in accordance with claim 1 wherein the latch release means and trip comprises a transverse rock shaft journalled in said frame and having a plurality of trip pins slidably mounted therein and biased to a nonactive position, and means for locking any one of said pins at a time in an active position with a portion of the active pin extending beyond the path of movement of the carrier for engagement with a station detent.

4. An article carrier in accordance with claim 1 wherein the latch means comprises two transverse rock shafts journalled in the frame fore and aft of the container, and each rock shaft has a releasable container supporting latch, and means interconnecting said rock shafts for simultaneous opposed rotation for simultaneous actuation of the container supporting latch of each rock shaft.

5. A conveyor system in accordance with claim 3 wherein the carrier frame is provided with an upstanding longitudinally extending flange and each station is provided with fixed guides having flared entrances for receiving said flange and stabilizing the carrier laterally prior to the carrier trip pin engaging the station detent.

6. An article carrier in accordance with claim 2 wherein the container and cover latch means comprises a transverse rock shaft rotatably mounted in the frame having the container latch means affixed to the shaft, and the cover latch means freely rotatable on the shaft with an over-running connection for simultaneous rotation with the container latch means when rocked to container latch release position, and wherein the trip comprises trip pin slidably disposed in said rock shaft, means for biasing said trip pin to an inactive position, and means for locking said pin in an active position, with an end projecting beyond the path of movement of the carrier.

7. An article carrier in accordance with claim 2 wherein the container and cover latch means comprises a transverse rock shaft rotatably mounted in the frame having the container latch means affixed to the shaft, and the cover latch means freely rotatable on the shaft with an over-running connection for simultaneous rotation with the container latch means when rocked to container latch release position, and wherein the trip comprises a plurality of pins slidably disposed in said rock shaft and means to bias each pin to an inactive position, and means for locking any one of said pins in an active position, with an end projecting beyond the path of movement of the carrier, and means for releasing a pin locked in active position by moving another pin into locking and active position.

References Cited by the Examiner

UNITED STATES PATENTS 3,171,362  3/1965  Noye et al. _____ 198—38 X
3,223,226  12/1965  Bishop _____ 198—38

EVON C. BLUNK, *Primary Examiner.*

A. C. HODGSON, *Assistant Examiner.*